United States Patent Office 3,072,613
Patented Jan. 8, 1963

3,072,613
MULTIPLE CYCLIC CARBONATE POLYMERS
John M. Whelan, Jr., Murray Hill, and Robert J. Cotter, East Orange, N.J., assignors to Union Carbide Corporation, a corporation of New York
No Drawing. Filed Aug. 20, 1957, Ser. No. 679,124
24 Claims. (Cl. 260—77.5)

This invention relates to the preparation of polymeric compositions of multiple cyclic carbonates and aliphatic polyamines. More particularly, this invention relates to polymeric substances prepared from multiple cyclic carbonates having the structure

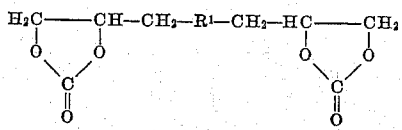

and polyfunctional aliphatic amines having a plurality of reactive amine groups, and preferably an amine having the formula $R^2(NH_2)_x$, where $R^2$ is a polyvalent aliphatic hydrocarbon having a valence equal to $x$ and $x$ is an integer from two to four inclusive.

According to the present invention, we have now prepared substantially linear polymers represented by the repeating units:

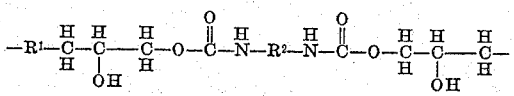

or

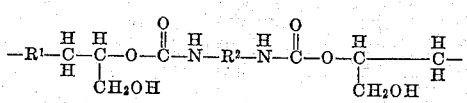

or mixtures of such repeating units, by the reaction of multiple cyclic carbonates and difunctional primary amines, which are useful in industry for coating, molding and adhesive uses, and for film and fiber forming applications.

These new linear polymeric substances have been found to possess a number of interesting properties which make possible their adaptation to a variety of uses. They are basically thermoplastic in nature. The polymers are nearly colorless and are obtained in hard, colorless, brittle resin form for the lower molecular weight products, or tough, rubbery solids for high molecular weight products. They are quite soluble in solvents such as dimethylformamide and dimethyl sulfoxide. They are readily cast into tough, colorless films having excellent clarity and tear resistance by extrusion or solvent casting techniques, or they can be extruded into fibers having high tensile strengths even at high elongation. The fibers are hydrophilic in nature, which tends to make them more dye receptive and decreases static build-up.

We have further discovered that with amines of higher functionality these cyclic carbonates produce cross-linked infusible polymers which are particularly useful as casting or potting compositions. These materials are suitably hardened without catalysts at room temperature to hard, tough resins. They are also useful as adhesives or impregnants which can be cured to hard, infusible bonds.

The chemical resistance of the polymers to most common reagents as dilute acids as hydrochloric and sulfuric acid to solvents such as acetone, ethanol, and benzene, is good. Caustic soda (10%), however, causes some disintegration of the polymers and should be avoided.

The cyclic carbonates which we have found useful in producing the polymeric products of this invention can be represented by the general formula

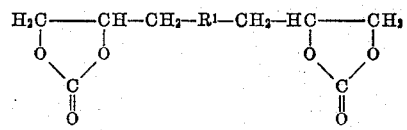

where $R^1$ is a divalent radical free of groups reactive with amine and carbonate groups under the conditions of the reaction. Any groups reactive with the cyclic carbonate groups of the carbonate reactant or with the amine groups of the polyamine reactant will interfere with the desired reaction and cannot be tolerated.

The preferred cyclic carbonate compounds for use in this invention are those in which the $R^1$ group is oxygen linked. By the term "oxygen-linked" we mean that valence bonds of the pendant carbonate groups must be linked together through an oxygen atom, such as in diglycerol dicarbonate, or through valence bonds of terminal oxygen atoms of aliphatic or aromatic residues, particularly of diether, diester, and diurethane residues. Still more particularly, the dicarbonates in which the $R^1$ group is oxygen or composed of oxygen-linked hydrocarbon or oxyhydrocarbon groups or of an oxygen-linked urethane hydrocarbon.

The preferred dicarbonate represented is diglycerol dicarbonate in which $R^1$ is oxygen and which has the formula

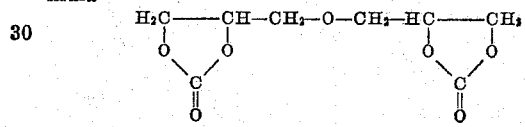

This dicarbonate is secured by the reaction of diglycerol with diethyl carbonate by the use of basic catalysts such as organic basic compounds, alkali metals, or alkali metal compounds followed by distillation to recover ethanol. Such methods will produce the diglycerol dicarbonate in good yields as crystals melting at about 105°–108° C.

Another class of preferred carbonates is represented by the glycerol carbonate diethers of aryl-substituted alkyl compounds. Particularly preferred of this class is where $R^1$ is bisphenolic alkane residue represented by the structure

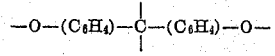

These compounds are produced in the reaction by the addition reaction of carbon dioxide to diglycidyl compounds, the reaction being catalyzed by basic materials such as organic basic compounds, alkali metals, and alkaline earth metal salts in a polar fluid medium, such as ethylene carbonate, dimethylformamide or dimethylsulfoxide. The product is readily recovered by removal of the fluid medium or by precipitation by the addition of an inert non-solvent for the dicarbonate.

A third class of preferred carbonates can be represented by the glycerol carbonate diesters of dibasic acids such as the alkyl and aryl diacids, for example where $R^1$ would have the structure

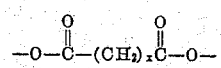

where $x$ is an integer between 1 and 6 inclusive or where $R^1$ has the structure

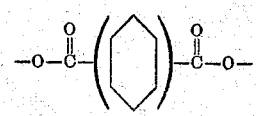

and the substituted derivatives thereof. These are conveniently prepared by the reaction of the corresponding diacid chlorides with glycerol carbonate in the presence of a base or basic compound to pick up the liberated hydrogen chloride.

A fourth class of preferred carbonates is represented by the alkylene diurethanes of glycerol carbonate in which $R^1$ has the structure

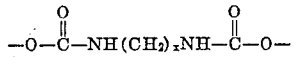

where $x$ is an integer between about 2 to 20 inclusive; the diaryl alkane diurethanes of glycerol carbonate in which $R^1$ has the structure

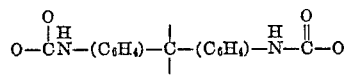

and substituted derivatives thereof; and aryl diurethanes of glycerol carbonate in which $R^1$ has the structure

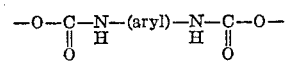

for instance tolylene diurethane of glycerol carbonate, naphthalene diurethane of glycerol carbonate, and the like. These compounds are prepared by the reaction of the corresponding diisocyanate with glycerol carbonate at room temperatures and above. The reaction proceeds without benefit of a catalyst although a basic catalyst can be employed to hasten the reaction. The product can be recovered by distillation techniques or by precipitation from solvents by the addition of a non-solvent to the dissolved mixture.

A fifth class of preferred carbonates is represented by the reaction products of phosgene and glycerol carbonate, i.e. glycerol carbonate chloroformate, reacted with bisphenolic alkanes, wherein $R^1$ is represened by the structure

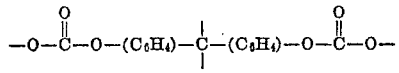

The reaction is readily conducted in a solvent at room temperature in the presence of a base such as caustic or pyridine to pick up the liberated hydrogen chloride and the products recovered by washing the solution with dilute caustic and water and stripping off the solvent.

The amines found to be particularly desirable in producing the linear polymeric products of this invention are the unhindered primary aliphatic diamines having the general formula $H_2N-R^2-NH_2$ where $R^2$ is an alkylene group containing from about 2 to 20 carbon atoms. Typical of some of these diamines are ethylene diamine, hexamethylene diamine, and 1,3-diaminobutane. Aromatic amines, it has been found, are unsuitable in that hydroxyalkylation products instead of hydroxypolyurethanes are prepared. Sterically hindered amines, for instance menthane diamine, are not suitable because of their unreactive nature. However, secondary aliphatic amines can be used, but are not nearly as desirable as primary amines because of their reduced reactivity with the cyclic carbonate group.

While the linear polymeric products of diamines and cyclic carbonates as herebefore described are the preferred materials, we have found that insoluble, infusible, cross-linked polymers are prepared with amines of high functionality, such as triamines, pentamines, etc. for instance tris(aminoethyl) amine, tetraethylene pentamine, diethylenetriamine, and the reaction products of any of these amines with glycidyl compounds.

For the preparation of linear polymers, the reaction components are preferably mixed in essentially equimolar proportions so that the highest molecular weight products are produced. For the preparation of cross-linked, insoluble infusible polymers from amines of a functionality higher than two, the ratio will depend primarily upon the system functionality. Preferably, stoichiometric amounts are employed, yielding a more uniform and reproducible product.

The reaction of these amines and the cyclic carbonates is readily accomplished without need of a catalyst at a temperature within the range of 0° C. to 100° C. or higher, depending on system reactivity and the fluidity and miscibility of the components. Room temperature reactions are particularly preferred because of the ease of reaction and control. With high melting cyclic carbonate compounds melting above about 60° C., the reaction to produce linear polymers is preferably conducted in a solvent for instance ethyl acetate, dimethyl sulfoxide, dimethyl formamide, benzene, etc. to facilitate mixing and to avoid any extremely vigorous reaction. The solvent method also gives the highest molecular weight polymers. When solvents are employed, the product is readily recovered by vacuum distillation of the solvent at a temperature below the degradation temperature of the polymer, preferably below about 125° C. or by precipitating the polymer by the addition of a non-solvent for the polymer, such as water or lower aliphatic alcohols.

The product of this invention can vary from hard, brittle polymers having reduced viscosities of as low as 0.12 up to more rubbery, tough polymers having reduced viscosities as high as 0.8 to 1.0 as determined by reduced viscosity measurements at 25° C. of 0.2 gram sample in 100 ml. dimethylformamide solution. It is a feature of these products that a longer polymerization time in a solvent such as dimethylformamide will result in high molecular weight polymers having reduced viscosities of 0.6 to 1.0 depending on the dicarbonate selected. Such polymers are tough, rubbery solids as contrasted to the more brittle and inflexible materials obtained when the polymerization is conducted at higher temperatures, i.e. always in excess of 30° C. These higher temperature polymerizations, we have found, produce polymeric products having lower reduced viscosities of 0.2 up, depending primarily on the dicarbonate selected.

The following examples are illustrative of our invention.

EXAMPLE 1

(A) *Preparation of Hexamethylene Diurethane of Glycerol Carbonate*

236.2 parts of glycerol carbonate and 84.1 parts of hexamethylene diisocyanate were mixed and stirred at 80° C. for five hours. After standing at room temperature overnight, the mixture solidified. The solid product was vigorously mixed with 600 parts of water, filtered, and the precipitate washed with water, then dried in vacuo at 40° C. The product was purified by recrystallization from absolute alcohol and the yield of purified product was 138 parts of white crystals, M.P. 121–127° C. The product had a nitrogen content of 7.0 percent, whereas calculated nitrogen content for hexamethylene diuretane of glycerol carbonate was 6.95 percent. It was further identified as hexamethylene diurethane of glycerol carbonate by infra-red analysis.

(B) *Preparation of a Linear Polymer With Hexamethylene Diamine*

Five parts of the dicarbonate from (A) and 1.44 parts of hexamethylene diamine were dissolved in 15 parts N,N-dimethylformamide at room temperature for 24 hours and the solvent was then removed under reduced pressure 0.1 mm. Hg at 100° C. the residue product was cured by heating at 50° C. for four days and then at 75° C. for three days. The polymeric product, after curing, had a reduced viscosity of 0.69 measured as a 0.2 gram sample in 100 cc. of dimethylformamide at 25° C. The product was a hard, tough resin with a softening point of about 100° C.

(C)

One part of the resin prepared as described in (B) was dissolved in 2 parts dimethylformamide at 75° C. The resultant solution was then cast into a 5 mil film on glass and the solvent evaporated off by heating in air at 50°–100° C. for 3½ hours. The resulting film was stripped from the glass plate and possessed excellent clarity and physical properties as follows.

| | |
|---|---|
| Tensile strength | 5020 p.s.i. |
| Tensile modulus | 1100 p.s.i. |
| Percent elongation | 700. |
| Softening point | About 100° C. |
| Water adsorption (film in atmosphere 100% humidity) | 8.2%. |
| Water permeability (Payne cup) | 10.5 mg./cm.$^2$/mil. |
| Dielectric strength | 280 v./mil. (25° C.) 240 v./mil. (50° C.). |

Dielectric constant (85° F.):

| | |
|---|---|
| 60 cps | 13.8. |
| $10^3$ cps | 7.78. |
| $10^6$ cps | 4.59. |
| $50 \times 10^6$ cps | 3.78. |

Power factor:

| | |
|---|---|
| 60 cps | 0.446. |
| $10^3$ cps | 0.203. |
| $10^6$ cps | 0.106. |
| $50 \times 10^6$ cps | 0.0143. |

A sample of the film immersed in 10 percent aqueous hydrochloric acid, 10 percent aqueous sulfuric acid, water, acetone, ethanol, and benzene at room temperature for over a month showed no visible signs of attack. Immersion in 10 percent aqueous sodium hydroxide caused the film to become white and opaque with disintegration upon agitation.

(D) *Preparation of Linear Polymer With Ethylenediamine*

A mixture of five parts of the product from (A) and 0.75 part of ethylene diamine was dissolved in 15 parts of N,N-dimethylformamide at room temperature. The solution was maintained at room temperature for 24 hours and the solvent was then removed by distillation at a reduced pressure of 0.1 mm. Hg and a temperature of 100° C. The residue product was cured by heating at 50° C. for six days. The polymeric product, after curing, was an opaque, white, rubbery solid having a reduced viscosity of 0.36 measured as a 0.2 gram sample in 100 cc. of dimethylformamide at 25° C.

(E) *Preparation of a Cross-Linked Polymer With a Linear Polymer*

Fifty parts of the linear polymer from part (B) were dissolved in 150 parts of dimethyl sulfoxide and 13 parts of hexamethylene diisocyanate was added at room temperature. Films were immediately cast from this solution onto glass plates and cured 125° C. for one hour. After cooling, the films were colorless, had good adhesion to glass, and excellent transparency.

EXAMPLE 2

(A) *Preparation of Diglycerol Dicarbonate*

A mixture of 83 parts of redistilled diglycerol, 177 parts of redistilled diethyl carbonate, and two parts of potassium carbonate was slowly heated to 150° C. and the ethanol produced in the reaction was distilled off through a fractionating column. After five hours of reaction at 150° C. there was recovered 96 parts of distillate. The oily residue remaining in the reaction vessel was transferred to a separatory funnel and washed three times with 100 parts of water and two times with 50 parts of diethyl ether. After separation from the second ether wash, the product crystallized. The crystals were purified by recrystallization from absolute methanol to give a product in a yield of 56 percent based on diglycerol having a melting point of 105°–108° C. and an elemental analysis of 44.5° C; 4.8% H (calculated for diglycerol dicarbonate 44.1% C; 4.63% H). The product was further identified as diglycerol dicarbonate by the fact that the infra-red spectrum showed a strong band at 5.5 microns, characteristic of a five membered cyclic carbonate.

(B) *Preparation of Linear Polymer With Ethylene Diamine*

To five parts of the product from (A) there was added 1.4 parts of distilled ethylene diamine. A vigorous exothermic reaction increased the temperature to 100° C. and yielded a colorless viscous resin within ten minutes. On cooling to room temperature, a colorless hard resin resulted which could be drawn into fibers on warming to 100° C.

To a solution of five parts of the product from (A) in 50 parts of chloroform maintained at a temperature of 25° C. there was added 1.38 parts of ethylene diamine. The resultant mixture was heated to reflux (61.2° C.) and maintained under refluxing conditions for 30 minutes after which the chloroform was distilled from the mixture. The residue product was a brown resin having a reduced viscosity of 0.22 measured as a 0.2 gm. sample in 100 cc. dimethylformamide at 25° C.

(C) *Preparation of Cross-Linked Polymer With Tris-(Aminoethyl) Amine*

Ten parts of the product from (A) were mixed with 4.5 parts tris(aminoethyl) amine. An exothermic reaction resulted increasing the temperature to 100° C. The mixture was maintained at this temperature for thirty minutes. On cooling, the resultant product was a light brown rubbery, infusible resin.

EXAMPLE 3

(A) *Preparation of 4,4'-Diphenylmethane Urethane of Glycerol Carbonate*

A mixture of 23.6 parts of glycerol carbonate and 25 parts of 4,4'-diisocyanato diphenylmethane was maintained at 70° C. for two hours. The mixture was then allowed to stand at room temperature (25° C.) overnight when it solidified to a solid crystalline mass. This was recrystallized from a solvent mixture of 200 parts absolute ethanol and 50 parts of nitromethane. The resulting product comprised a yield of 35.2 parts of a crystalline solid having a melting point of 147°–154° C. Elemental analysis of 4,4'-diphenylmethane diurethane of glycerol carbonate: Found percent N=5.5. Calculated perecent N=5.8. The product was further established to be 4,4'-diphenylmethane diurethane of glycerol carbonate by infra-red analysis.

(B) *Preparation of the Linear Polymer With Ethylenediamine*

A mixture of five parts of the product from (A) and 0.62 part of ethylene diamine were dissolved in 40 parts ethanol and heated at refluxing temperature (78.4° C.) for five hours. The ethanol was stripped from the mixture to a residue temperature of 130° C. at a reduced pressure of 0.55 mm. Hg and maintained at this temperature for two hours. The resulting residue product was a brittle solid resin.

EXAMPLE 4

(A) *Preparation of the Glycerol Carbonate Diether of 2,2-Propylidene Bis(4-Phenol)*

A mixture of 19.5 parts of the diglycidyl ether of 2,2-propylene bis(4-phenol) having an epoxy assay of 195.5 grams per ml. epoxy equivalent; 132 parts of ethylene carbonate, and 0.33 part of triethyl amine as a catalyst was heated at 150° C. under reflux for 4½ hours. During this time, carbon dioxide was bubbled through the mixture at a rate in excess of its rate of absorption. At the conclusion of this period, the flow of carbon dioxide was stopped and the mixture heated to 150° C. under 2 mm. Hg pressure to strip off the ethylene carbonate. The residue comprised 244.8 parts of a light, straw-colored glassy product which was recrystallized from seven times its weight of benzene. The resulting white crystals were filtered off, washed with benzene and dried at 40° C. in vacuo (25 mm. Hg) for four hours. The crystals had an M.P. of 140–154° C. They were further purified by repeated recrystallization of benzene to obtain a crystalline product having a melting point of 160° C. The product was identified as the glycerol carbonate diether of 2,2-propylidene-bis(4-phenol) by infra-red spectrum analysis, molecular weight and saponification equivalent.

(B) *Preparation of the Linear Polymer With Hexamethylene Diamine*

A mixture of 13.6 parts of the product from (A) and 3.9 parts of hexamethylene diamine dissolved in 100 parts ethyl acetate was heated to refluxing temperature (75°–76° C.) and maintained under refluxing conditions for 18 hours. At the conclusion of this period, a precipitate had formed in the reaction mixture, which was then stripped of solvent by heating to a temperature of 100° C. at 25 mm. Hg pressure. The residue product was a light brown, transparent resin having a reduced viscosity of 0.28 as determined on a 0.2 gram sample in 100 cc. dimethylformamide at 25° C. The product could be drawn into fibers by heating to about 50° C.

EXAMPLE 5

(A) *Preparation of the Glycerol Carbonate Diether of Methylene Bis(4-Phenol)*

A solution made from 100 parts of the diglycidyl ether of methylene bis(4-phenol) (technical product), 0.25 part of triethylamine as a catalyst and 85.0 parts of ethylene carbonate was stirred and heated 150° C. under reflux while carbon dioxide was bubbled in at a rate in excess of its rate of absorption for seven hours. At the conclusion of this period, the flow of carbon dioxide was stopped and the reaction mixture cooled to room temperature (25° C.). Five hundred parts of water were added to the reaction mixture to precipitate the dicarbonate which was then filtered off, washed with 800 parts of water, and then dried at 40° C. in vacuo (25 mm. Hg) for four hours. There was obtained 108 parts of a white crystalline solid, M.P. 106°–131° C. Repeated recrystallization of this material from benzene yielded a material of M.P. 152°–158° C. and which on elemental analysis analyzed at 62.83% C and 5.01% H. Calculated for $C_{21}H_{20}O_8$ is 62.99% C and 5.04% H.

(B) *Preparation of a Linear Polymer With Hexamethylene Diamine*

A solution made from two parts of the product from (A), 0.58 part hexamethylene diamine, and 10 parts of dimethylformamide was kept at room temperature (25° C.) for 50 hours. The solvent was then removed under reduced pressure (0.1 mm. Hg) at 100° C. The residue remaining was a light yellow, transparent resin having a reduced viscosity of 0.21 measured with 0.1 g./100 ml. of dimethylformamide at 25° C.

EXAMPLE 6

To a solution containing 13 parts by weight of glycerol carbonate, 10.1 parts of triethyl amine as catalyst and 100 parts of anhydrous dioxane, there was added in a dropwise manner a solution made from 10.1 parts of terephthaloyl chloride and 50 parts of anhydrous dioxane. The reaction mixture was maintained at about 10° C. during the addition by immersing the reaction vessel in an ice bath. After addition was complete, the reaction mixture was maintained at room temperature and agitated for two hours during which a solid precipitated in the reaction mixture. The precipitate was filtered from the reaction mixture and added to 600 parts of water and stirred at room temperature for 30 minutes. The precipitate was again filtered from the washing water and dried, yielding 12.5 parts (68 percent yield) of bis-(2,3-carbonatoglyceryl) terephthalate. After a recrystallization from a tetrahydrofuran-dioxane mixture it had a melting point of 172–174° C. It was identified as bis-(2,3-carbonatoglyceryl) terephthalate by its infra-red spectrum and an elemental analysis of 52.1% C and 3.8% H (calculated for bis-(2,3-carbonatoglyceryl) terephthalate is 52.4% C and 3.8% H.

(B) *Polymerization*

To a solution prepared from 2.422 parts of the bis-(2,3-carbonatoglyceryl) terephthalate prepared in the above manner, 9.5 parts of dimethylformamide, there was added 0.768 part of hexamethylene diamine. The resultant mixture was then held at room temperature for 24 hours without agitation, after which the dimethylformamide was removed by heating to a temperature of 100° C. at 0.1 mm. Hg pressure. The remaining material after removal of the solvent was then heated at 175° C. for 96 hours to complete polymerization. The polymer was dissolved in 25 parts dimethylformamide and precipitated by adding the solution to 400 parts of water in a Waring Blendor. The dried polymeric product was a white, hard, and tough resin having a reduced viscosity of 0.57 (measured as a 0.2 gram sample in 100 ml. of dimethylformamide). The polymer softened at about 100° C.

EXAMPLE 7

A mixture of 118 parts of glycerol carbonate and 67 parts of methylene chloride was held at a temperature below 20° C. while passing in 99 parts of phosgene. After the addition of the phosgene was completed, 435 parts of methylene chloride was added and the resultant solution washed five times with 100 parts water. The organic layer was separated from the aqueous layer and was dried over calcium chloride.

The dry organic layer was stripped of methylene chloride under reduced pressure, the residue amounting to 87.2 parts of a material identified as glycerol carbonate chloroformate by infra-red spectrum.

(a) To a solution of 10 parts of 2,2-bis(4-hydroxyphenyl) propane, 3.92 parts sodium hydroxide, and 50 parts of water, there was added 17.5 parts of the glycerol carbonate chloroformate prepared in the above manner. Reaction was immediate and a precipitate formed. To the mixture there was then added 334 parts of methylene chloride and the resultant solution was washed repeatedly with 10% sodium hydroxide solutions then with water. After the final washing, the organic layer was stripped of methylene chloride under reduced pressure. The solid residue crystallized below room temperature and infra-red analysis showed it contained no hydroxyl groups.

(b) As an alternative method of preparation, 10 parts of 2,2-bis(4-hydroxyphenyl) propane, 88 parts of benzene, 6.8 parts pyridine were mixed and 15.9 parts of the glycerol carbonate chloroformate were added over a period of about 30 minutes. The resulting mixture was then stirred for an additional 60 minutes and 225 parts of chloroform was added. The solution was washed repeatedly with 10% sodium hydroxide solutions and then with water. The organic layer was stripped of chloroform under reduced pressure and analyzed by infra-red spectrophotometer. The solid product had no free hydroxyl group and was the same as that prepared in the above manner of part (*a*).

(c) *Polymerization.*—To a mixture of 5 parts of the addition product of 2,2-bis(4-hydroxyphenyl) propane and glycerol carbonate chloroformate prepared in the above described manner, dissolved in about 15 parts of dimethylformamide, there was added 1.125 parts of hexamethylene diamine. The mixture was stirred and left standing for three days after which the dimethylformamide was removed on a Rotovac at 100° C. over a period of 60 minutes.

The solid material was hard and tough and was obviously polymeric. It had a reduced viscosity of 0.12 measured as a 0.2 gram sample in 100 ml. dimethylformamide at 25° C.

We claim:

1. A resinous polyurethane product prepared by the reaction at a temperature above about 0° C. of a multiple cyclic carbonate having the structure

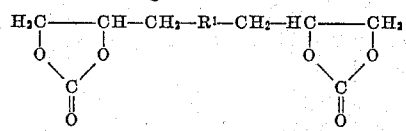

wherein $R^1$ is a divalent radical free of groups reactive under the conditions of the reaction with amine and carbonate groups and being selected from the class consisting of oxygen and organic radicals containing terminal oxygen atoms; and a polyfunctional aliphatic amine having at least two amino groups containing from 1 to 2, inclusive, replaceable hydrogens, said amine being reacted in amounts sufficient to give the polyurethane product a reduced viscosity of above about 0.12 as determined on a 0.2 gram sample of the said product in 100 ml. of dimethylformamide at 25° C.

2. A resinous polyurethane product prepared by the reaction at a temperature above about 0° C. of a multiple cyclic carbonate having the structure

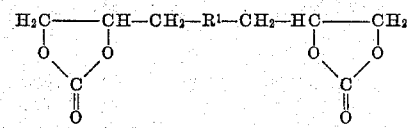

wherein $R^1$ is a divalent radical free of groups reactive, under the conditions of the reaction, with amine and carbonate groups and being selected from the class consisting of oxygen and organic radicals containing terminal oxygen atoms; and a polyfunctional aliphatic amine having the formula $R^2(NH_2)_x$ where $R^2$ is a polyvalent aliphatic hydrocarbon and $x$ is an integer from two to four inclusive, said amine being reacted in amounts sufficient to give the polyurethane product a reduced viscosity of above about 0.12 as determined on a 0.2 gram sample of said product in 100 ml. of dimethylformamide at 25° C.

3. A linear polyurethane product prepared by the reaction at a temperature above about 0° C. of a multiple cyclic carbonate having the structure

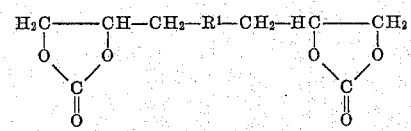

wherein $R^1$ is a divalent radical free of groups reactive, under the conditions of the reaction, with amine and carbonate groups and being selected from the class consisting of oxygen and organic radicals containing terminal oxygen atoms; with about equimolar amounts of an aliphatic diprimary diamine, said product being characterized by having a reduced viscosity of above about 0.12 as determined on a 0.2 gram sample of said product in 100 ml. of dimethyl formamide at 25° C.

4. A resinous polyurethane product prepared by the reaction at a temperature above about 0° C. of a multiple cyclic carbonate having the structure

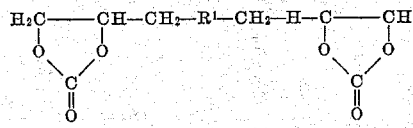

wherein $R^1$ is an organic radical containing terminal oxygen atoms and free of groups reactive under the conditions of the reaction with amine and carbonate groups, and a polyfunctional primary amine having the general formula $R^2(NH_2)_x$ wherein $R^2$ is a polyvalent aliphatic hydrocarbon and $x$ is an integer from 2 to 4, inclusive, said amine being reacted in amounts sufficient to give the polyurethane product a reduced viscosity of above about 0.12 as determined on a 0.2 gram sample of the said product in 100 ml. of dimethyl formamide at 25° C.

5. A resinous polyurethane product prepared by the reaction at a temperature above about 0° C. of diglycerol dicarbonate having the general structure

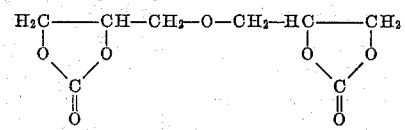

and a polyfunctional primary amine having the general formula $R^2(NH_2)_x$ wherein $R^2$ is a polyvalent aliphatic hydrocarbon and $x$ is an integer from 2 to 4, inclusive, said amine being reacted in amounts sufficient to give the polyurethane product a reduced viscosity of above about 0.12 as determined on a 0.2 gram sample of the said product in 100 ml. of dimethyl formamide at 25° C.

6. A resinous polyurethane product as described in claim 1 wherein $R^1$ is oxygen and the amine has two amino groups each containing from 1 to 2, inclusive, replaceable hydrogens, and is reacted in about equimolar amounts.

7. A resinous polyurethane product as described in claim 1 wherein $R^1$ is the residue of a bisphenolic alkane and is represented by the structure

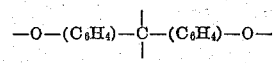

and the amine has two amino groups each containing from 1 to 2, inclusive, replaceable hydrogens, and is reacted in about equimolar amounts.

8. A resinous polyurethane product as described in claim 1 wherein $R^1$ is the residue of a dibasic aliphatic acid and is represented by the structure

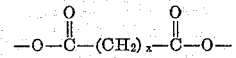

wherein $x$ is an integer between 1 and 6 inclusive, and the amine has two amino groups each containing from 1 to 2, inclusive, replaceable hydrogens, and is reacted in about equimolar amounts.

9. A resinous polyurethane product as described in claim 1 wherein $R^1$ is the residue of a dibasic aromatic acid and is represented by the structure

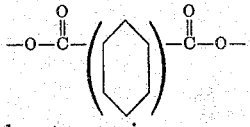

and the amine has two amino groups each containing from 1 to 2, inclusive, replaceable hydrogens, and is reacted in about equimolar amounts.

10. A resinous polyurethane product as described in claim 1 wherein $R^1$ is the residue of an alkylene diurethane and is represented by the structure

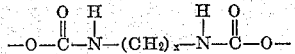

wherein $x$ is an integer between about 2 to 20 inclusive, and the amine has two amino groups each containing from 1 to 2, inclusive, replaceable hydrogens, and is reacted in about equimolar amounts.

11. A resinous polyurethane product as described in claim 1 wherein $R^1$ is the residue of a diaryl alkane diurethane and is represented by the structure

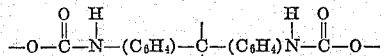

and the amine has two amino groups each containing from 1 to 2, inclusive, replaceable hydrogens, and is reacted in about equimolar amounts.

12. A resinous polyurethane product as described in claim 1 wherein $R^1$ is the residue of an aryl diurethane and is represented by the structure

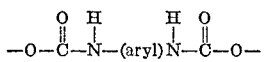

and the amine has two amino groups each containing from 1 to 2, inclusive, replaceable hydrogens, and is reacted in about equimolar amounts.

13. A method for the preparation of resinous polyurethane products which includes the steps of admixing and reacting at a temperature above about 0° C., a multiple cyclic carbonate having the structure

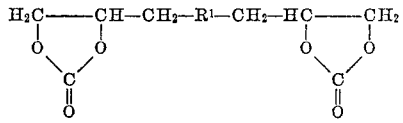

wherein $R^1$ is a divalent radical free of groups reactive under the conditions of the reaction with amine and carbonate groups and being selected from the class consisting of oxygen and organic radicals containing terminal oxygen atoms, and a polyfunctional aliphatic amine having at least two amino groups containing from 1 to 2, inclusive, replaceable hydrogens, said amine being present in amounts sufficient to give the polyurethane product a reduced viscosity of at least about 0.12, as determined on a 0.2 gram sample of the said product in 100 ml. of dimethyl formamide at 25° C.

14. A method for producing a resinous polyurethane product as described in claim 13 wherein the reaction is conducted in the presence of an inert liquid medium.

15. A method for producing resinous polyurethane products which includes the steps of admixing and reacting at a temperature of between about 0° C. to about 100° C. a multiple cyclic carbonate having the structure

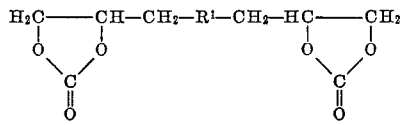

wherein $R^1$ is a divalent radical free of groups reactive under the conditions of reaction with amine and carbonate groups and being selected from the class consisting of oxygen and organic radicals containing terminal oxygen atoms, and a polyfunctional aliphatic amine having the formula $R^2(NH_2)_x$ where $R^2$ is a polyvalent aliphatic hydrocarbon and $x$ is an integer from two to four, inclusive, said amine being present in amounts sufficient to give the polyurethane product a reduced viscosity of at least about 0.12 as determined on a 0.2 gram sample of said product in 100 ml. of dimethylformamide at 25° C., and thereafter recovering the said product.

16. A method for producing a resinous polyurethane product described in claim 15 wherein the reaction is conducted in the presence of an inert liquid medium.

17. A method for the preparation of a resinous polyurethane product as described in claim 13 wherein $R^1$ is oxygen and the amine has two amino groups each containing from 1 to 2, inclusive, replaceable hydrogens, and is reacted in about equimolar amounts.

18. A method for the preparation of a resinous polyurethane product as described in claim 13 wherein $R^1$ is the residue of a bisphenolic alkane and is represented by the structure

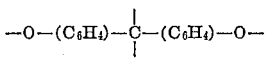

and the amine has two amino groups each containing from 1 to 2, inclusive, replaceable hydrogens, and is reacted in about equimolar amounts.

19. A method for the preparation of a resinous polyurethane product as described in claim 13 wherein $R^1$ is the residue of a dibasic aliphatic acid and is represented by the structure

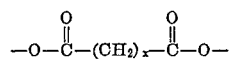

wherein $x$ is an integer between 1 and 6 inclusive, and the amine has two amino groups each containing from 1 to 2, inclusive, replaceable hydrogens, and is reacted in about equimolar amounts.

20. A method for the preparation of a resinous polyurethane product as described in claim 13 wherein $R^1$ is the residue of a dibasic aromatic acid and is represented by the structure

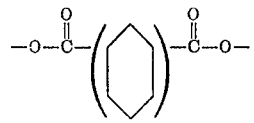

and the amine has two amino groups each containing from 1 to 2, inclusive, replaceable hydrogens, and is reacted in about equimolar amounts.

21. A method for the preparation of a resinous polyurethane product as described in claim 13 wherein $R^1$ is the residue of an alkylene diurethane and is represented by the structure

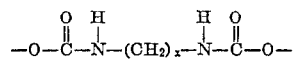

wherein $x$ is an integer between about 2 to 20 inclusive, and the amine has two amino groups each containing from 1 to 2, inclusive, replaceable hydrogens, and is reacted in about equimolar amounts.

22. A method for the preparation of a resinous polyurethane product as described in claim 13 wherein $R^1$ is the residue of a diaryl alkane diurethane and is represented by the structure

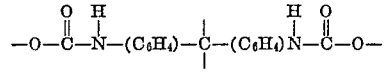

and the amine has two amino groups each containing from 1 to 2, inclusive, replaceable hydrogens, and is reacted in about equimolar amounts.

23. A method for the preparation of a resinous polyurethane product as described in claim 13 wherein $R^1$ is the residue of an aryl diurethane and is represented by the structure

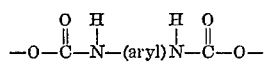

and the amine has two amino groups each containing from 1 to 2, inclusive, replaceable hydrogens, and is reacted in about equimolar amounts.

24. The process of preparing a polyurethane resin which comprises reacting about equimolar proportions of an aliphatic diprimary diamine and a carbonate of the formula

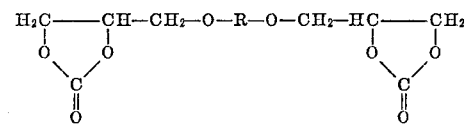

wherein R is a divalent organic radical.

References Cited in the file of this patent

UNITED STATES PATENTS 2,802,022    Groszos et al.           Aug. 6, 1957

FOREIGN PATENTS 109,064    Sweden                 Nov. 16, 1943